(12) United States Patent
Ching

(10) Patent No.: US 6,793,029 B2
(45) Date of Patent: Sep. 21, 2004

(54) AUTOMOBILE INERTIA KINETIC ENERGY REGENERATION SYSTEM

(76) Inventor: Li Kuo Ching, P.O.Box 82-144, Taipei (TW)

( * ) Notice: Subject to any disclaimer, the term of this patent is extended or adjusted under 35 U.S.C. 154(b) by 0 days.

(21) Appl. No.: 10/216,760

(22) Filed: Aug. 13, 2002

(65) Prior Publication Data

US 2004/0031634 A1 Feb. 19, 2004

(51) Int. Cl.⁷ ................................................. B60K 6/00
(52) U.S. Cl. ...................... 180/165; 180/302; 60/408; 60/413
(58) Field of Search .......................... 180/160, 2.1, 2.2, 180/302; 303/127, 152; 60/408, 409, 413

(56) References Cited

U.S. PATENT DOCUMENTS

| | | | | |
|---|---|---|---|---|
| 3,913,699 A | * | 10/1975 | Dyer | 180/302 |
| 4,163,367 A | * | 8/1979 | Yeh | 60/414 |
| 4,227,587 A | * | 10/1980 | Carman | 180/165 |
| 4,290,268 A | * | 9/1981 | Lowther | 60/668 |
| 4,590,767 A | * | 5/1986 | Gardner, Jr. | 60/668 |
| 4,592,454 A | * | 6/1986 | Michel | 192/3.23 |
| 4,596,119 A | * | 6/1986 | Johnson | 60/407 |
| 4,798,053 A | * | 1/1989 | Chang | 60/712 |
| 5,050,936 A | * | 9/1991 | Tanaka et al. | 303/3 |
| 5,549,174 A | * | 8/1996 | Reis | 180/165 |
| 5,927,829 A | * | 7/1999 | Saga et al. | 303/152 |
| 6,508,324 B1 | * | 1/2003 | Conley, Jr. | 180/165 |

* cited by examiner

Primary Examiner—Brian L. Johnson
Assistant Examiner—Brian L Swenson
(74) Attorney, Agent, or Firm—Leong C. Lei

(57) ABSTRACT

An automobile inertial kinetic energy regeneration system which saves energy and enhances safety includes a driving element installed on the automobile drive shaft. The driving element clutches at a clutch that drives a power generator. With the power generator, the braking inertia kinetic energy is converted into pressurized air to be stored in a power tank. Once the driver steps on the gas pedal again in an attempt to start the vehicle, the automobile drive shaft will be driven by a driving installation connected to a clutch which clutches at the driving element. Given the aforesaid design, braking inertia kinetic energy is stored to assist in driving a vehicle, saving energy, shortening the braking distance and enhancing driving safety effectively.

1 Claim, 1 Drawing Sheet

AUTOMOBILE INERTIA KINETIC ENERGY REGENERATION SYSTEM

BACKGROUND OF THE INVENTION

1. Field of the Invention

This invention is related to an automobile inertia kinetic energy regeneration system, and in particular to one that can store energy to assist in driving a vehicle, and enable a vehicle to decelerate sooner, with a view to enhancing driving safety.

2. Description of the Prior Art

In general, to slow down his or her vehicle, a driver always presses the brake pedal in an extremely gentle manner so as to enable the vehicle to decelerate smoothly and efficiently, though the driver may brake sharply to avoid a collision. Take a modem vehicle as an example, once a driver steps on the brake pedal, the clutch of the automobile drive shaft will be disconnected from the engine, but the automobile drive shaft will continue to rotate by inertia. Being disconnected from the engine, the automobile drive shaft will only come to a halt when it is stopped by the braking system.

As indicated above, the period from the disconnection to the halt is characterized by a total waste of inertia kinetic energy. A design which recycles inertia kinetic energy is energy-saving; moreover, the recycled inertia kinetic energy can be used to halt the vehicle in a shorter period of time and thus enhance the braking effect as well as driving safety.

According to the above explanation, there is indeed a waste of brake-related inertia kinetic energy on the part of the vehicles nowadays. Hence, the primary object of this invention is to study how to recycle such kind of inertia kinetic energy efficiently for the purpose of energy savings and safety enhancement.

SUMMARY OF THE INVENTION

This invention is to develop an energy-saving automobile inertia kinetic energy regeneration system that enhances the safety in braking a vehicle.

Hence, the primary object of this invention is to provide an automobile inertia kinetic energy regeneration system that stores energy to assist in driving a vehicle.

The secondary object of this invention is to provide an automobile inertia kinetic energy regeneration system that enables a vehicle to decelerate sooner, with a view to enhancing driving safety.

The foregoing object and sun provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
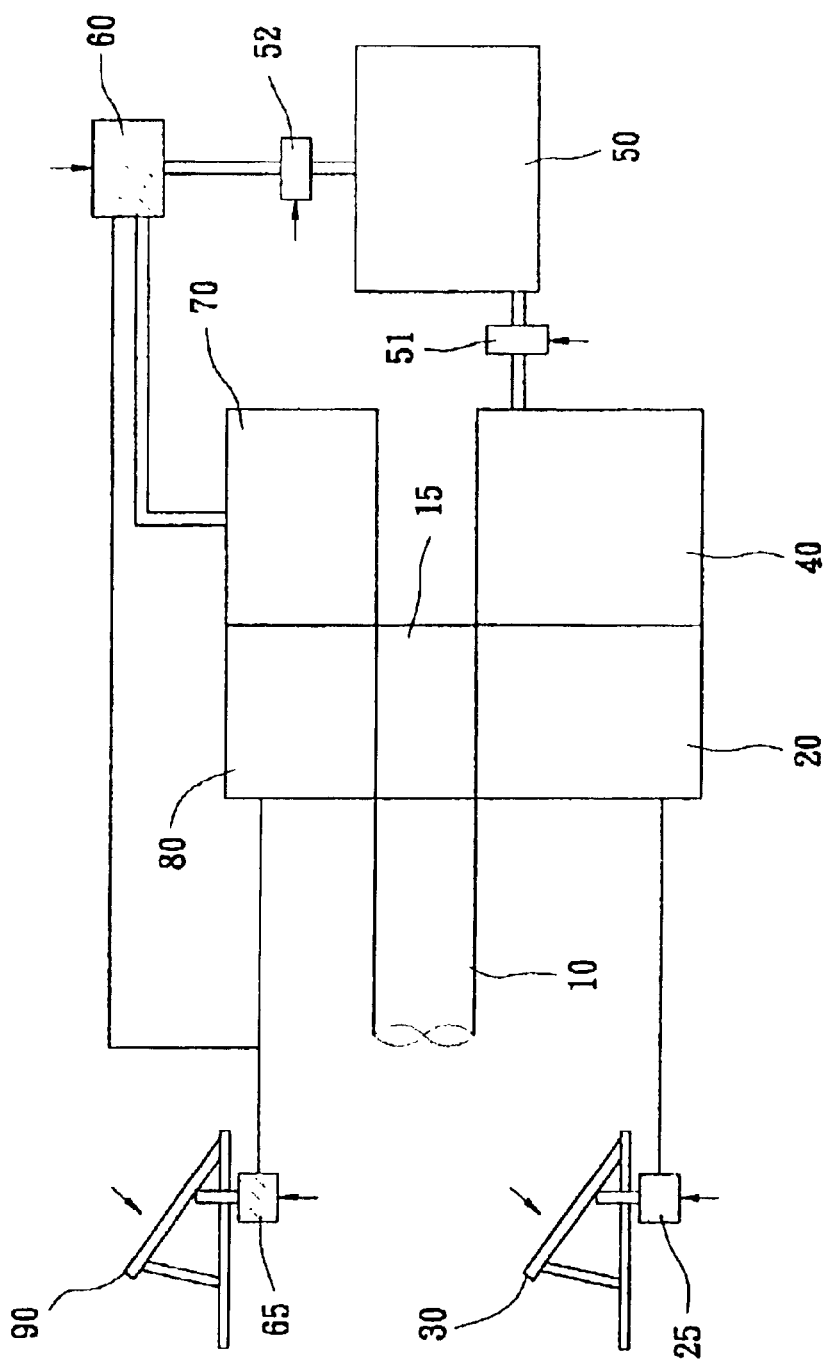
FIG. 1 depicts the regeneration system of this invention. It primarily illustrates the distribution of, and relationship between, the components of the preferred embodiment of this invention

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

This invention is about a recyclable automobile inertia kinetic energy regeneration system for braking kinetic energy. Please refer to FIG. 1. The regeneration system is designed in such a way that it comprises the following components. On the automobile drive shaft 10, there is a driving element 15 (gears in the preferred embodiment of this invention). One side of the driving element 15 can clutch a braking anterior electromagnetic clutch 20. The clutch function and disconnection function of the braking anterior electromagnetic clutch 20 are controlled by a clutch switch 25 beneath the brake pedal 30. The aforesaid automobile drive shaft 10 drives a power generator 40 (the preferred embodiment of this invention uses an air compressor as the power generator). The power generator 40 stores the pressurized air in a power tank 50 (a pneumatic storage unit in the preferred embodiment of this invention). A stabilization installation 51 is positioned between the power tank 50 and the power generator 40, so as to make the power generator 40 generate steadily press air for filling the power tank 50, with a view to keeping a certain level of braking force on the part of the automobile drive shaft 10.

A control switch 60 is installed behind the power tank 50, to control the lowering of the internal pressure of the power tank 50. A pressure release installation 52 is positioned between the power tank 50 and the control switch 60, to restrict the internal pressure of the power tank 50. The control switch 60 is, in turn, regulated by a clutch switch 85 beneath the gas pedal 90. A driving installation 70 (a pneumatic motor in the preferred embodiment of this invention) is positioned behind the control switch 60. The driving installation 70 is connected to an electromagnetic clutch 80 which clutches at the driving element 15 of the automobile drive shaft 10. In addition, the electromagnetic clutch 80 is also driven by the clutch switch 65 beneath the gas pedal 90, for controlling the clutch and disconnection between the electromagnetic clutch 80 and the driving element 15.

Given the aforesaid design, braking kinetic energy of the automobile drive shaft 10 may be converted to pressurized air for storage, and the driving of the automobile drive shaft 10 is timely improved, enabling an automobile inertia kinetic energy regeneration system which saves energy and enhances safety.

FIG. 1 also illustrates the application of this invention. If a driver wants to brake the vehicle, the first thing the driver will do is to release the gas pedal 90 to disconnect the automobile drive shaft 10 from the engine, so that the automobile drive shaft 10 will turn by inertia. Then, while the driver is pressing the brake pedal 30 harder and harder, the driver may tun on the underlying clutch switch 25, to make the braking anterior electromagnetic clutch 20 clutch at the driving element 15 of the automobile drive shaft 10, and then drive the power generator 40 so as to tun inertia kinetic energy into pressurized air, with a view to filling the power tank 50 with the pressurized air by means of the stabilization installation 51.

Once the driver releases the brake pedal 30, the braking anterior electromagnetic clutch 20 will be disconnected from the driving element 15. Then, when the driver steps on the gas pedal 90, the driver will be allowed to turn on the underlying clutch switch 65 which may, firstly, simultaneously drive the electromagnetic clutch 80 of the driving installation 70 so as to enable the electromagnetic clutch 80 to clutch at the driving element 15, and, secondly, enable the control switch 60 to start and release the stored kinetic energy for driving the driving installation 70. As regards the latter function, the amount of the kinetic energy released is determined by how hard the gas pedal 90 is pressed, so that both the driving installation 70 and the engine-driven automobile drive shaft 10 will turn synchronously. As a result the driving of the automobile drive shaft 10 is enhanced, inertia kinetic energy is recycled, and energy is saved.

Given the special aforesaid design, this invention has, at least, the following effects and functional improvements in practice.

1. Save Energy, Help to Drive.

Since the post-braking kinetic energy of the automobile drive shaft is efficiently recycled and turned into pressurized air for store, and the stored pressurized air is timely released to assist the engine in driving the automobile drive shaft, it takes less time for the automobile drive shaft to reach the intended tuning speed, the engine consumes less energy, and cost-efficiency is enhanced 2. Help to Brake, Enhance Safety.

Once a vehicle brakes, the automobile drive shaft will turn by inertia However, the post-braking kinetic energy of the automobile drive shaft wanes sooner, because the automobile drive shaft must also drive the power generator after the vehicle began to brake. There are two consequences. Firstly, the vehicle decelerates sooner, enhancing the safety in braking the vehicle. Secondly, it takes the vehicle less time to brake, reducing the wear and tear on a brake system and thus cutting the cost.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spit of the present invention.

What is claimed is:

1. An automobile inertia kinetic energy regeneration system for a vehicle comprising:

a driving element installed on an automobile drive shaft of said vehicle;

a first electromagnetic clutch engageable with of said driving element;

a first clutch switch connected with a gas pedal and connected with said first electromagnetic clutch;

a pneumatic motor connected with said first electromagnetic clutch;

a control switch connected with a driving installation;

a second electromagnetic clutch engageable with said driving element;

a second clutch switch connected with a brake pedal and connected with second electromagnetic clutch;

an air compressor connected with said second electromagnetic clutch;

a stabilization installation connected with said air compressor;

a pneumatic storage unit connected with said stabilization installation; and a pressure release installation connected between said pneumatic storage unit and said control switch;

whereby when said brake pedal is pressed, said second clutch switch will be actuated to engage said second electromagnetic clutch with said driving element thereby connecting said automobile drive shaft to said air compressor via said driving element and said second electromagnetic clutch and therefore compressing air into pneumatic storage unit; and when said gas pedal is pressed, said first clutch switch will be actuated to engage said first electromagnetic clutch with said driving element thereby connecting said automobile drive shaft to said pneumatic motor via said driving element and said first electromagnetic clutch and said control switch will be turned on to connect said pneumatic storage unit with said pneumatic motor thereby transmitting an additional power to said automobile drive shaft.

* * * * *